(12) United States Patent
Sung et al.

(10) Patent No.: US 8,879,449 B2
(45) Date of Patent: Nov. 4, 2014

(54) METHOD OF ACQUIRING SYSTEM INFORMATION IN WIRELESS COMMUNICATION SYSTEM

(75) Inventors: Doo-Hyun Sung, Anyang-si (KR); Jae Hoon Chung, Anyang-si (KR); Kyu Jin Park, Anyang-si (KR); Eun Jong Lee, Anyang-si (KR); Han Gyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 12/674,017
(22) PCT Filed: Sep. 18, 2008
(86) PCT No.: PCT/KR2008/005523
§ 371 (c)(1),
(2), (4) Date: Feb. 18, 2010
(87) PCT Pub. No.: WO2009/038367
PCT Pub. Date: Mar. 26, 2009

(65) Prior Publication Data
US 2011/0075621 A1 Mar. 31, 2011

Related U.S. Application Data

(60) Provisional application No. 60/973,177, filed on Sep. 18, 2007, provisional application No. 60/973,770, filed on Sep. 20, 2007, provisional application No. 60/982,392, filed on Oct. 24, 2007, provisional application No. 60/987,775, filed on Nov. 14, 2007.

(30) Foreign Application Priority Data

Feb. 29, 2008 (KR) .................. 10-2008-0018755
Jul. 1, 2008 (KR) .................. 10-2008-0063603

(51) Int. Cl.
*G08C 17/00* (2006.01)
*H04B 7/212* (2006.01)
*H04W 4/00* (2009.01)
*H04W 48/12* (2009.01)

(52) U.S. Cl.
CPC ............ *H04W 48/12* (2013.01); *Y02B 60/50* (2013.01)
USPC ............ 370/311; 370/324; 370/329; 370/341

(58) Field of Classification Search
USPC .......................................... 370/311
See application file for complete search history.

(56) References Cited

U.S. PATENT DOCUMENTS 7,016,680 B2 3/2006 Yagi
7,904,055 B2 3/2011 Lee et al.
(Continued)

FOREIGN PATENT DOCUMENTS

CN 1505416 A 6/2004
CN 1567769 A 1/2005
(Continued)

OTHER PUBLICATIONS

Ghosh et al., "Random Access Design for UMTS Air-Interface Evolution", In: Vehicular Technology Conference, Apr. 2007. VTC2007-Spring. IEEE 65th, 22-25, pp. 1041-1045.

(Continued)

*Primary Examiner* — Derrick Ferris
*Assistant Examiner* — Kodzovi Acolatse
(74) *Attorney, Agent, or Firm* — Birch, Stewart, Kolasch & Birch, LLP

(57) ABSTRACT

A method of acquiring system information in a wireless communication system includes receiving scheduling system information including scheduling information indicating a start time of dynamic system information, monitoring the dynamic system information from a start time of the dynamic system information according to the scheduling system information, and ending the monitoring of the dynamic system information upon receiving a system information end indicator indicating an end time of the dynamic system information. Since an end time of dynamic system information is indicated, a process of acquiring system information can be further effectively performed.

20 Claims, 8 Drawing Sheets

(56) References Cited

U.S. PATENT DOCUMENTS

| | | | |
|---|---|---|---|
| 7,916,689 | B2 | 3/2011 | Jeong et al. |
| 2003/0040311 | A1 | 2/2003 | Choi |
| 2003/0054820 | A1* | 3/2003 | Kang et al. .................. 455/434 |
| 2004/0162074 | A1 | 8/2004 | Chen |
| 2005/0037798 | A1 | 2/2005 | Yamashita et al. |
| 2005/0090278 | A1 | 4/2005 | Jeong et al. |
| 2005/0153700 | A1* | 7/2005 | Farnsworth et al. .......... 455/446 |
| 2007/0004445 | A1 | 1/2007 | Dorsey et al. |
| 2007/0053383 | A1* | 3/2007 | Choi et al. .................. 370/469 |
| 2007/0098053 | A1 | 5/2007 | Rinne et al. |
| 2007/0116094 | A1 | 5/2007 | Parts et al. |
| 2007/0123265 | A1 | 5/2007 | Moon |
| 2007/0223510 | A1 | 9/2007 | Joo |
| 2008/0043771 | A1 | 2/2008 | Cho et al. |
| 2008/0049708 | A1 | 2/2008 | Khan et al. |
| 2008/0176565 | A1 | 7/2008 | Eerolainen et al. |
| 2008/0220784 | A1 | 9/2008 | Somasundaram et al. |
| 2008/0268843 | A1 | 10/2008 | Ore et al. |
| 2008/0313300 | A1* | 12/2008 | Alanara et al. ................ 709/208 |
| 2009/0088160 | A1 | 4/2009 | Pani et al. |
| 2010/0081438 | A1 | 4/2010 | Callender et al. |
| 2010/0183031 | A1* | 7/2010 | Dalsgaard et al. ............ 370/474 |
| 2010/0195522 | A1 | 8/2010 | Lee et al. |
| 2010/0195579 | A1 | 8/2010 | Park et al. |
| 2010/0297991 | A1* | 11/2010 | Dahlman et al. ........... 455/422.1 |

FOREIGN PATENT DOCUMENTS

| | | |
|---|---|---|
| CN | 1725869 A | 1/2006 |
| CN | 1835627 A | 9/2006 |
| EP | 1 286 564 A1 | 2/2003 |
| EP | 1917824 A1 | 5/2008 |
| EP | 2 512 186 A1 | 10/2012 |
| KR | 10-2007-0023203 A | 2/2007 |
| WO | 2004/040935 A1 | 5/2004 |
| WO | 2007/052888 A2 | 5/2007 |
| WO | WO-2007/052888 | 5/2007 |
| WO | WO-2007/052916 A1 | 5/2007 |
| WO | 2007/077096 A2 | 7/2007 |

OTHER PUBLICATIONS

3GPP TS 36.300 V8.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); Jul. 3, 2007, (http://www.3gpp.org/ftp/Specs/2007-06/Rel-8/36__series/36300-810.zip).

Nokia Siemens Networks, Nokia, "E-UTRA Measurements and Cell Reselection Considerations", 3GPP TSG-RAN WG2 Meeting #58bis, R2-072386, R2-071727, Jun. 25-29, 2007, pp. 1-5.

Nokia, Nokia Siemens Networks, "E-UTRA Cell Selection and Cell Reselection Aspects", 3GPP TSG-RAN4 Metting #43bis, R4-071118, Jun. 25-29, 2007, pp. 1-5.

Ericsson, "Summary of E-mail Discussion on Cell Reselection Parameters in LTE," Agenda Item 4.02, 3GPP TSG-RAN WG2 #58, TDOC R2-071808, May 7-11, 2007, Kobe, Japan, 4 pages.

3GPP, "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)," 3GPP TR 25.813 V7.1.0, Sep. 2006, pp. 19-22.

3GPP, "Technical Specification Group Radio Access Network; User Equipment (UE) procedures in idle mode and procedures for cell reselection in connected mode (Release 7)," 3GPP TS 25.304 V7.2.0, Jun. 2007, pp. 15-33.

Motorola, "Random Access Prodedure and Message Contents," 3GPP TSG-RAN WG2 AH, R2-061991, Jun. 27-30, 2006, pp. 1-4.

Samsung, "Contention resolution," 3GPP TSG RAN2#54, R2-062260, Aug. 28-Sep. 2, 2006, 2 pages total.

3GPP, 3rd Generation Partnership Project; Technical Specification Group Radio Access Network; Evolved Universal Terrestrial Radio Access . . . , 3GPP TR 25.813 v7.1.0, Sep. 2006, pp. 19-22.

ETRI—Electronics and Telecommunications Research Institute, "Radio Access Network Technology in 3GPP Evolution (Elementary Technologies of the Evolved RAN based on 3GPP LTE standards)," Jun. 29, 2007, pp. 1-35.

3GPP, "Technical Specification Group Radio Access Network; Evolved Universal Terrestrial Radio Access (E-UTRA) and Evolved Universal Terrestrial Radio Access Network (E-UTRAN; Overall description; Stage 2 (Release 8)", 3GPP TS 36.300 V8.1.0, Jun. 2007, 106 pages.

* cited by examiner

METHOD OF ACQUIRING SYSTEM INFORMATION IN WIRELESS COMMUNICATION SYSTEM

This application is the National Phase of PCT/KR2008/005523 filed on Sep. 18, 2008, which claims priority under 35 U.S.C. 119(e) to U.S. Provisional Application Nos. 60/973,177 filed on Sep. 18, 2007; 60/973,770 filed on Sep. 20, 2007; 60/982,392 filed on Oct. 24, 2007 and 60/987,775 filed on Nov. 14, 2007; respectively and under 35 U.S.C. 119(a) to Patent Application Nos. 10-2008-0018755 and 10-2008-0063603 filed in Korea on Feb. 29, 2008 and Jul. 1, 2008; respectively, all of which are hereby expressly incorporated by reference into the present application.

TECHNICAL FIELD

The present invention relates to wireless communications, and more particularly, to a method of acquiring system information in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future.

In general, there are one or more cells within the coverage of a base station (BS). A plurality of user equipments (UEs) may be located in one cell. When a UE attempts an initial access to a new cell, the UE is downlink synchronized, and receives system information (or simply referred to as SI) from a network to be accessed. The SI includes necessary information which needs to be known to the UE in order to communicate with the BS. Thus, the UE has to entirely receive the SI before accessing to the BS, and has to always maintain the latest SI. The BS informs the UE of a plurality of pieces of basic information required to access to the network by using the SI.

The SI includes various SI parameters. In general, the BS distributively transmits the SI parameters according to a defined transmission period instead of concurrently transmitting the entire SI parameters. The BS has to inform the UE of scheduling information for transmitting the SI parameters. The UE monitors the SI according to the scheduling information of the SI. If there is no accurate scheduling information of the SI, the UE has to persistently monitor the SI, which may lead to unnecessary power consumption.

Accordingly, there is a need to inform the accurate scheduling information of the SI so that the UE can further effectively obtain the SI.

DISCLOSURE OF INVENTION

Technical Problem

The present invention provides a method for acquiring system information.

Technical Solution

According to an aspect of the present invention, a method of acquiring system information in a wireless communication system includes receiving scheduling system information including scheduling information indicating a start time of dynamic system information, monitoring the dynamic system information from a start time of the dynamic system information according to the scheduling system information, and ending the monitoring of the dynamic system information upon receiving a system information end indicator indicating an end time of the dynamic system information.

According to another aspect of the present invention, a method of updating system information in a wireless communication system includes monitoring a downlink control channel to detect a system information change notification, and upon detecting the system information change notification, receiving at least one dynamic system information message and a scheduling system information message comprising an update indicator that indicates an update of the dynamic system information message.

Advantageous Effects

According to the present invention, since an end time of dynamic system information is indicated, a process of acquiring system information can be further effectively performed. Instead of continuously receiving system information, a user equipment monitors a physical downlink control channel (PDCCH), and, if the system information is changed, receives updated dynamic system information transmitted through a physical downlink shared channel (PDSCH), thereby reducing battery consumption. A base station reports the change of the system information through the PDCCH, and transmits an update indicator and scheduling information regarding dynamic system information through the PDSCH. As a result, the user equipment can effectively update the system information without performing an unnecessary process.

MODE FOR THE INVENTION

Figure 1:
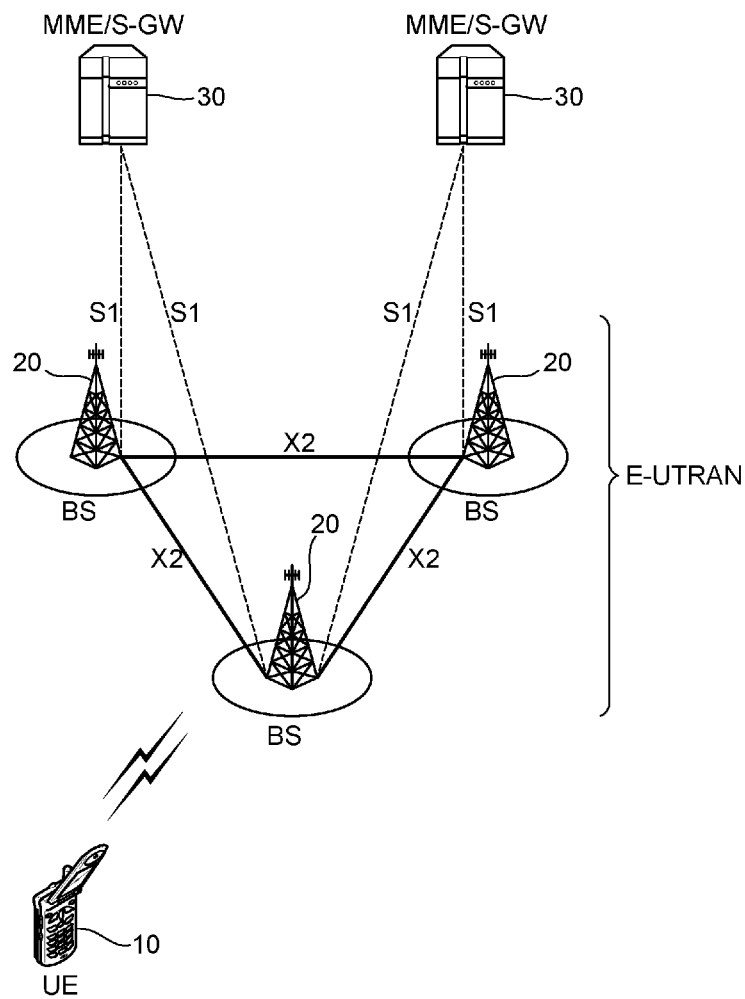
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink (DL) is defined as a communication link from the BS 20 to the UE 10, and an uplink (UL) is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 2:
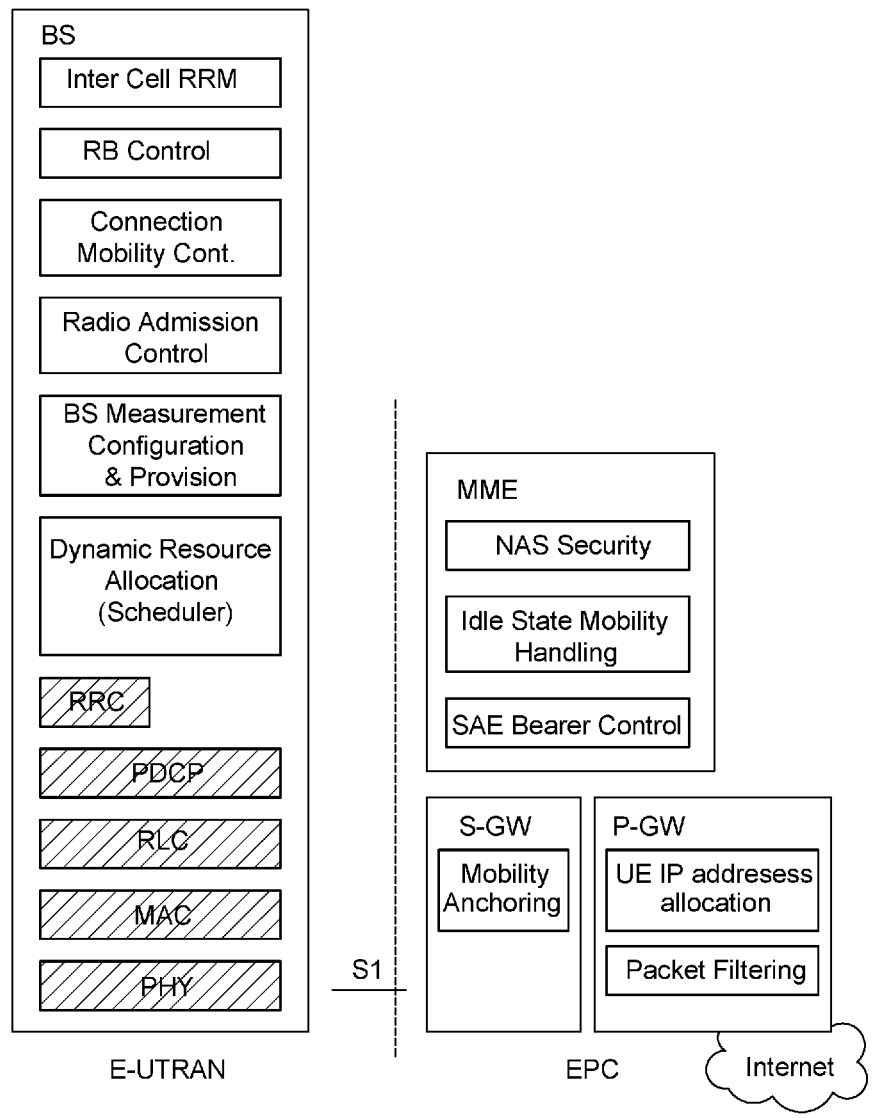
FIG. 2 is a diagram showing functional split between an evolved universal terrestrial radio access network (E-UTRAN) and an evolved packet core (EPC).

FIG. 2 is a diagram showing functional split between the E-UTRAN and the EPC.

Referring to FIG. 2, slashed boxes indicate radio protocol layers and white boxes indicate functional entities of the control plane.

The BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) non-access stratum (NAS) signaling; (2) NAS signaling security; (3) idle mode UE reachability; (4) tracking area list management; (5) roaming; and (6) authentication.

The S-GW performs the following functions: (1) mobility anchoring; and (2) lawful interception. A PDN gateway (P-GW) performs the following functions: (1) UE IP allocation; and (2) packet filtering.

Figure 3:
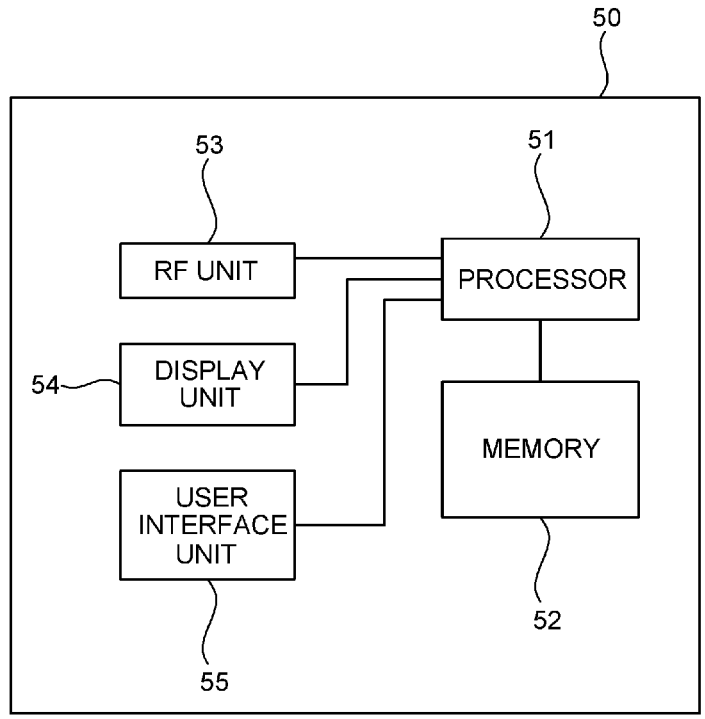
FIG. 3 is a block diagram showing constitutional elements of a user equipment (UE).

FIG. 3 is a block diagram showing constitutional elements of the UE.

Referring to FIG. 3, a UE 50 includes a processor 51, a memory 52, a radio frequency (RF) unit 53, a display unit 54, and a user interface unit 55.

Layers of a radio interface protocol are implemented in the processor 51. The processor 51 provides the control plane and the user plane. The function of each layer can be implemented in the processor 51. The processor 51 performs acquiring and update process of system information to be described below.

The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. A PHY layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
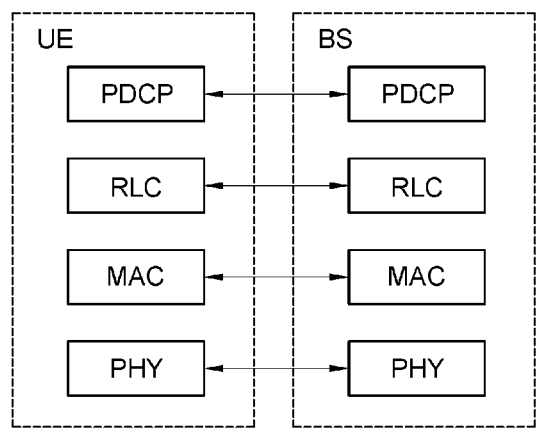
FIG. 4 is a diagram showing a radio protocol architecture for a user plane.
Figure 5:
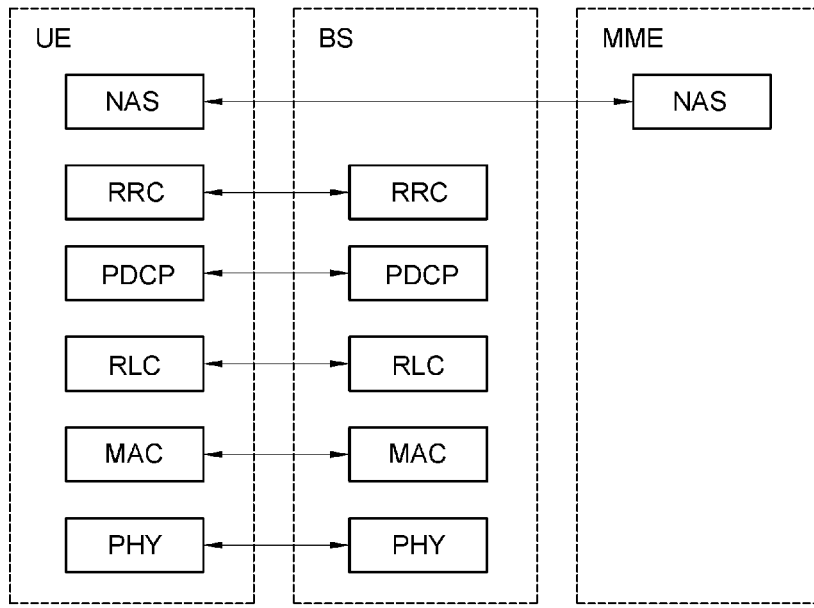
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate an architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel. The PHY layer can be modulated by orthogonal frequency division multiplexing (OFDM). Time and/or frequency can be utilized as radio resources.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. A TM RLC is a mode in which no overhead is added to an RLC service data unit (SDU) delivered from an upper layer when an RLC protocol data unit (PDU) is configured. The PDU denotes a unit of block data delivered from a current layer to another layer. Since the RLC allows transparent passing of the SDU, it is called the TM RLC. A UM RLC allows a receiving side to know which PDU is lost when transmission is made by attaching a PDU header including a sequence number (SN) to each PDU. An AM RLC provides bidirectional data transmission services and supports retransmission when the transfer of the RLC PDU fails.

A packet data convergence protocol (PDCP) layer belongs to the second layer and performs a header compression function. When transmitting an IP packet such as an IPv4 packet or an IPv6 packet, a header of the IP packet may contain relatively large and unnecessary control information. The PDCP layer reduces a header size of the IP packet so as to efficiently transmit the IP packet.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

The RRC connected mode denotes a state in which the UE is connected to an RRC of the E-UTRAN. The RRC connected mode can be characterized as follows: (1) The UE has a context that is information for RB configuration by which user plane data can be transmitted between the BS and the UE; (2) The E-UTRAN knows a cell to which the UE belongs; (3) The network can transmit and receive data to and from the UE, and can control mobility of the UE; (4) Neighbor cell measurement can be performed; and (5) Transmitting/receiving of data between the UE and the network in the PDCP/RLC/MAC layers, control signaling channel monitoring for allocation of a data channel for the UE, reporting of channel quality information and feedback information, and configuring of a discontinuous reception (DRX) period for power saving of the UE and for effective resource utilization can be performed.

A non-access stratum (NAS) layer belongs to an upper layer of the RRC layer and serves to perform session management, mobility management, or the like.

Figure 6:
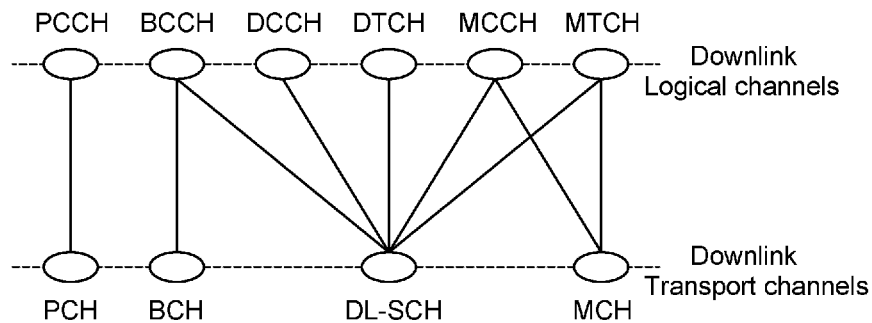
FIG. 6 shows mapping between downlink logical channels and downlink transport channels.
Figure 7:
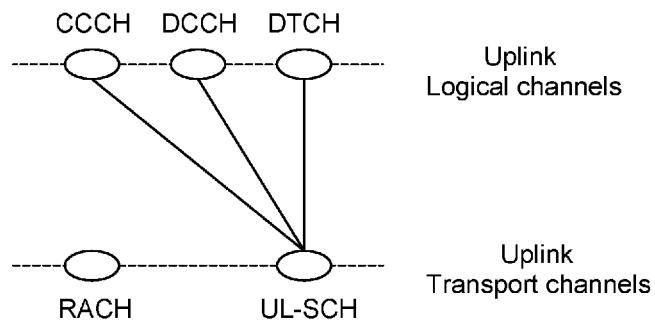
FIG. 7 shows mapping between uplink logical channels and uplink transport channels.

FIG. 6 shows mapping between downlink logical channels and downlink transport channels. FIG. 7 shows mapping between uplink logical channels and uplink transport channels. This may be found in section 6.1.3 of the 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Referring to FIGS. 6 and 7, in downlink, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH). In uplink, the CCCH, the DCCH, and the DTCH are mapped to an uplink shared channel (UL-SCH).

According to a type of data to be transmitted, the logical channel mapped onto the transport channel is classified into a control channel and a traffic channel. The control channel is for transmitting information of the control plane. According to a type of control information, the control channel may be a broadcast control channel (BCCH), a paging control channel (PCCH), a common control channel (CCCH), a dedicated control channel (DCCH), a multicast control channel (MCCH), etc. The PCCH is a downlink channel for transmitting paging information and is used when a network does not know the location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information from the network to the UE. The MCCH is used by UEs that receive an MBMS. The DCCH is a point-to-point bi-directional channel for transmitting dedicated control information between the UE and the network, and is used by UEs having an RRC connection.

The traffic channel is for transmitting traffic data of the user. The traffic channel may be a dedicated traffic channel (DTCH), an MBMS traffic channel (MTCH) (where MBMS stands for multimedia broadcast multicast service), etc. The transport channel serves to transmit data delivered from the logical channel. A plurality of logical channels can be mapped onto one transport channel.

The transport channel is classified according to a type and characteristic of data transmission through a radio interface. The BCH is broadcast in the entire coverage area of the cell and has a fixed, pre-defined transport format. The DL-SCH is characterized by support for hybrid automatic repeat request (HARQ), support for dynamic link adaptation by varying modulation, coding, and transmit (Tx) power, possibility to be broadcast in the entire cell, and possibility to use beamforming, support for both dynamic and semi-static resource assignment, support for UE discontinuous reception (DRX) to enable UE power saving, and support for MBMS transmission. The PCH is characterized by support for DRX to enable UE power saving and requirement to be broadcast in the entire coverage area of the cell. The MCH is characterized by support for requirement to be broadcast in the entire coverage area of the cell and support for an MBMS single frequency network (MBSFN).

The UL-SCH and a random access channel (RACH) are uplink transport channels. The UL-SCH is characterized by support for dynamic link adaptation for changing the modulation, coding, and Tx power and support for HARQ and dynamic/semi-static resource assignment. The RACH is characterized by limited control information and collision risk.

Figure 8:
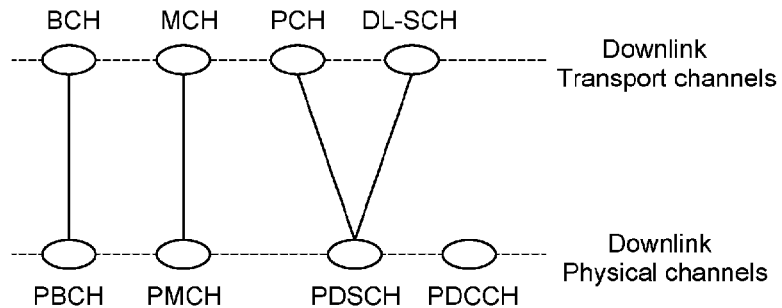
FIG. 8 shows mapping between downlink transport channels and downlink physical channels.
Figure 9:
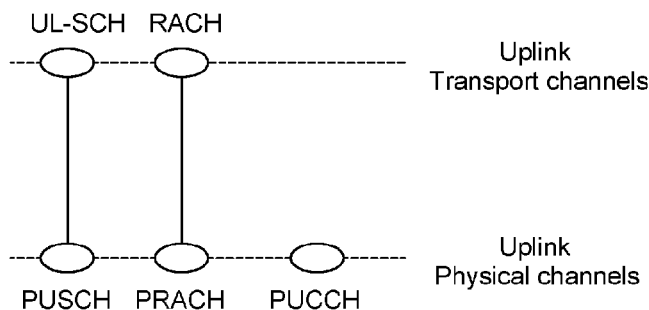
FIG. 9 shows mapping between uplink transport channels and uplink physical channels.

FIG. 8 shows mapping between downlink transport channels and downlink physical channels. FIG. 9 shows mapping between uplink transport channels and uplink physical channels.

Referring to FIGS. 8 and 9, a downlink transport channel is for transmitting data from the network to the UE. Examples of the downlink control channel includes a broadcast channel (BCH) for transmitting system information, a paging channel (PCH) for transmitting a paging message, and a downlink-shared channel (DL-SCH) for transmitting user traffic or control messages. Traffic of downlink multicast or broadcast services or control messages can be transmitted on the DL-SCH or a downlink multicast channel (MCH). In downlink, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH.

An uplink transport channel is for transmitting data from the UE to the network. Examples of the uplink transport channel include a random access channel (RACH) for transmitting an initial control message and an uplink-shared channel (UL-SCH) for transmitting user traffic or control message. In uplink, a UL-SCH is mapped to a physical uplink shared channel (PUSCH). An RACH is mapped to a physical random access channel (PRACH). The PRACH carries a random access preamble.

In the PHY layer, examples of downlink channels include a physical downlink control channel (PDCCH) for transmitting control information and a physical downlink shared channel (PDSCH) for transmitting user data and/or control information. In the PHY layer, examples of uplink channels include a physical uplink control channel (PUCCH) and a physical uplink shared channel (PUSCH). The PDCCH informs a UE of resource assignment of the PCH and DL-SCH, and also informs the UE of HARQ information related to the DL-SCH. The PDCCH may carry an uplink scheduling grant which informs the UE of resource assignment for uplink transmission. A physical control format indicator channel (PCFICH) informs the UE of the number of orthogonal frequency division multiplexing (OFDM) symbols used for the PDCCHs and is transmitted in every subframe. A physical hybrid ARQ indicator channel (PHICH) carries HARQ acknowledgement (ACK)/negative-acknowledgement (NACK) signals in response to uplink transmission. A physical uplink control channel (PUCCH) carries uplink control information such as HARQ ACK/NACK signals in response to down transmission, scheduling request, a channel quality indicator (CQI), etc.

Now, transmission of system information will be described. A BS manages radio resources of one or more cells. One cell is configured to have one of bandwidths such as 1.25, 2.5, 5, 10, 20 MHz and provides downlink or uplink transmission services to several UEs. In this case, different cells can be configured to provide different bandwidths. Cell configuration can be achieved in such as manner that several cells geographically overlap by using several frequencies. The BS informs the UEs of basic information for network access by using system information (or simply referred to as SI). The SI includes necessary information which needs to be known to the UEs so as to access to the BS. Therefore, the UEs have to entirely receive the SI before accessing to the BS and always have to maintain the latest SI. Since the SI has to be known to all UEs within one cell, the BS periodically transmits the SI.

The SI is an RRC message for transmitting a plurality of system information blocks (SIBs). The SIBs transmitted as one piece of system information have the same scheduling condition, which is called periodicity. One or more SI messages can be transmitted with the same periodicity. Each SIB includes an SI parameter.

Figure 10:
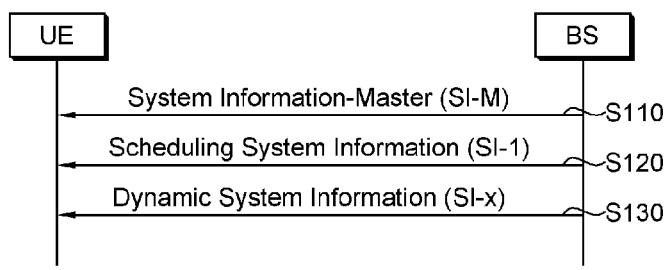
FIG. 10 is a flow diagram showing a process of transmitting system information.

FIG. 10 is a flow diagram showing a process of transmitting system information.

Referring to FIG. 10, a BS transmits a system information master (SI-M) to a UE (step S110). The SI-M is transmitted through a broadcast channel (BCH). System information transmitted through the BCH includes one SIB. The SIB is referred to as a master information block (MIB). The SI-M includes a PHY layer parameter, a system frame number (SFN), scheduling information regarding scheduling system information, etc. The SI-M is also referred to as broadcast system information.

The PHY layer parameter may include a downlink system bandwidth, the number of transmit antennas, a reference signal transmit power, etc. When the SFN is not transmitted using a specific method, the SFN is transmitted by being included in the SI-M. The SI-M can be transmitted with a fixed periodicity. The SI-M may be transmitted with a period of 40 ms. The scheduling system information is most frequently transmitted in a repetitive manner among a plurality of pieces of system information.

The BS transmits the scheduling system information (SI-1) to the UE (step S120). The scheduling system information is most frequently transmitted in a repetitive manner among a plurality of pieces of system information, and is transmitted through a downlink-shared channel (DL-SCH). The UE can obtain the scheduling information regarding the scheduling system information from the SI-M. The scheduling system information includes scheduling information regarding dynamic system information.

The scheduling information regarding the dynamic system information indicates periodicity of system information other than the scheduling system information. For example, the scheduling information regarding the dynamic system information may indicate a start time of the dynamic system information. The scheduling system information includes an update indicator indicating an update state of the dynamic system information. The update indicator indicates whether the dynamic system information is modified. For example, the UE can use the update indicator to determine whether previously obtained system information is effective information until the UE returns to a cell coverage after moving out of the cell coverage. The scheduling system information may further includes one or more public land mobile network (PLMN) identifiers for identifying a cell providing radio access, a tracking area code for identifying a tracking area where the cell belongs, a cell identify that is a unique identifier of the cell, system information block mapping information, etc. The scheduling system information can be transmitted with a fixed periodicity. The scheduling system information may be transmitted with a period of 80 ms.

The BS transmits the dynamic system information (SI-x) to the UE (step S130). The dynamic system information is transmitted through the DL-SCH. The dynamic system information transmitted through the DL-SCH includes several pieces of system information not included in the broadcast system information. The scheduling system information is more frequently transmitted than the dynamic system information. The UE can obtain the scheduling information regarding the dynamic system information from the scheduling system information. A transmission period of the dynamic system information is not fixed. Thus, the dynamic system information is transmitted according to a transmission period determined by the scheduling system information.

Hereinafter, scheduling information regarding dynamic system information included in scheduling system information will be described.

Figure 11:
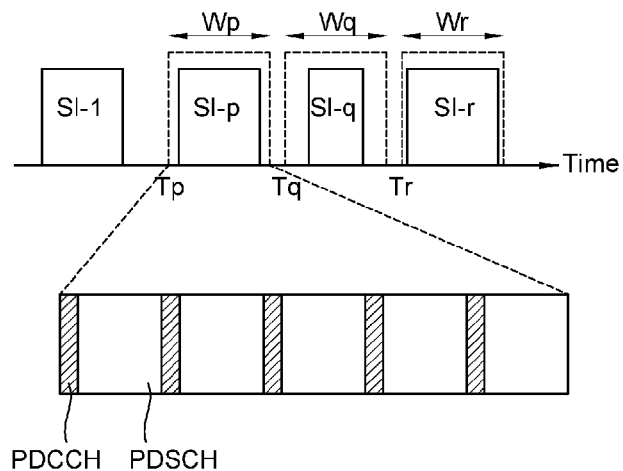
FIG. 11 shows an example of scheduling for dynamic system information.

FIG. 11 shows an example of scheduling for dynamic system information.

Referring to FIG. 11, scheduling system information provides scheduling information to a plurality of pieces of dynamic system information. The scheduling information regarding the plurality of pieces of dynamic system information is indicated in the range of a time window to which the dynamic system information is allocated. The range of the time window can be expressed with a start time and a window size.

It will be assumed, for example, that scheduling system information, i.e., SI-1, provides scheduling information regarding three pieces of dynamic system information, i.e., SI-p, SI-q, and SI-r. Table 1 shows an example of the scheduling information regarding the dynamic system information.

TABLE 1

| Dynamic SI | Start time of time window | Window size |
|---|---|---|
| SI-p | Tp | Wp |
| SI-q | Tq | Wq |
| SI-r | Tr | Wr |

The scheduling system information indicates types (i.e., SI-p, SI-q, and SI-r) of the dynamic system information. The scheduling system information indicates a start time Tp and a window size Wp of a time window of the SI-p, indicates a start time Tq and a window size Wq of a time window of the SI-q, and indicates a start time Tr and a window size Wr of a time window of the SI-r. Time window sizes of the respective pieces of dynamic system information may be indicated to have either the same size or different sizes. Time windows of the respective pieces of dynamic system information do not overlap with one another. Each piece of dynamic system information is transmitted in the range of a corresponding time window. The UE obtains the range of the dynamic system information from the scheduling system information and thus detects the dynamic system information within the range of the time window.

The UE monitors whether the dynamic system information is transmitted through the PDCCH during the dynamic system information range obtained from the scheduling system information. Monitoring is to detect desired information by decoding a signal received through a corresponding channel. An identifier for indicating a presence/absence of system information is referred to as a system information identifier. Upon detecting the system information identifier on the PDCCH, the UE receives the dynamic system information through a PDSCH. The dynamic system information may (or may not) be transmitted with a window size smaller than the time window range. An unnecessary load may be generated if the UE monitors and decodes all PDCCHs within the time window range of the dynamic system information whenever necessary.

Figure 12:
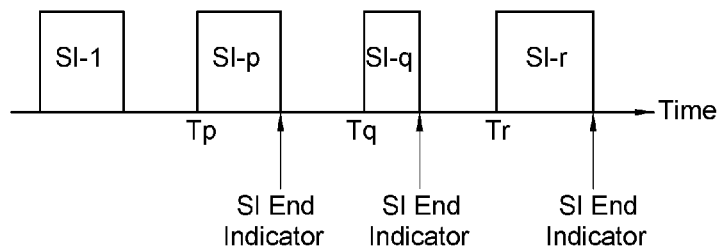
FIG. 12 shows a method for acquiring system information according to an embodiment of the present invention.

FIG. 12 shows a method for acquiring system information according to an embodiment of the present invention.

Referring to FIG. 12, scheduling system information indicates scheduling information regarding a plurality of pieces of dynamic system information according to a start time of the dynamic system information.

It will be assumed, for example, that scheduling system information, i.e., SI-1, provides scheduling information regarding three pieces of dynamic system information, i.e., SI-p, SI-q, and SI-r. Table 2 shows an example of the scheduling information regarding the dynamic system information.

TABLE 2

| Dynamic SI | Start time of dynamic SI |
|---|---|
| SI-p | Tp |
| SI-q | Tq |
| SI-r | Tr |

The scheduling system information indicates types (i.e., SI-p, SI-q, and SI-r) of the respective pieces of dynamic system information, and also indicates start times Tp, Tq and Tr of the respective pieces of dynamic system information. The BS transmits the respective pieces of dynamic system information at the start times of the respective pieces of dynamic system information. However, the BS transmits the dynamic system information until a start time of subsequent dynamic system information begins. That is, the BS transmits the respective pieces of dynamic system information so that the respective pieces of dynamic system information do not overlap in a time domain. The UE starts to monitor the dynamic system information at a start time of the dynamic system information obtained from the scheduling system information. That is, the UE detects a system information identifier from a PDCCH after the start time. Upon detecting the system information identifier from the PDCCH, the UE receives the dynamic system information.

An end time of each piece of dynamic system information is indicated by an SI end indicator. The end indicator indicates the end time of each piece of dynamic system information. The SI end indicator can indicate a subframe at which the dynamic system information ends. The SI end indicator may be transmitted using a message of a MAC layer, an RLC layer, or an RRC layer. The SI end indicator may be assigned to a last portion of the dynamic system information to indicate that transmission of the dynamic system information is finished. The SI end indicator may be transmitted through the PDCCH. The end of transmission of the dynamic system information can be implicitly reported through the PDCCH. For example, 'transport block size=0' may be indicated through the PDCCH, or the end of transmission of the dynamic system information may be indicated using a value which cannot be used in practice for radio resources. The UE stops receiving of the dynamic system information upon receiving the SI end indicator, and receives next dynamic system information at a start time of the next dynamic system information. That is, when the SI end indicator is received, the UE may not monitor the PDCCH until the start time of the next dynamic system information elapses in order to receive the dynamic system information.

As such, since the scheduling system information indicates the scheduling information regarding the dynamic system information by using the start time of the dynamic system information, a size of the scheduling system information can be decreased, thereby reducing an overhead caused by signaling. Further, the dynamic system information can be further effectively scheduled without restriction of a size of the time window of the dynamic system information. Furthermore, since the end time of transmission of the dynamic system information is indicated, the UE does not perform unnecessary decoding of the PDCCH. Thus, battery consumption can be reduced, and the procedure of obtaining system information can be further effectively performed.

Figure 13:
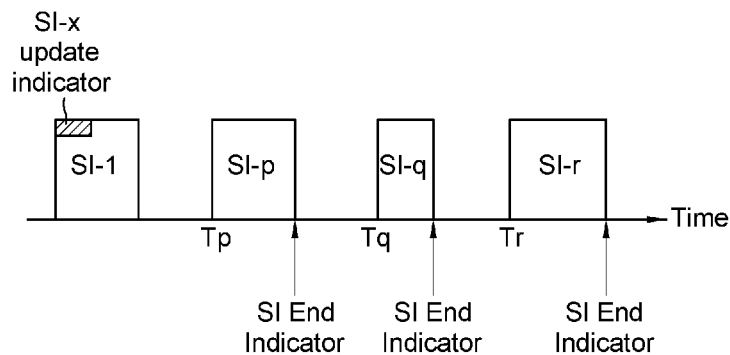
FIG. 13 shows a method for acquiring system information according to another embodiment of the present invention.

FIG. 13 shows a method for acquiring system information according to another embodiment of the present invention.

Referring to FIG. 13, scheduling system information can indicate scheduling information regarding dynamic system information according to a start time of the dynamic system information and an SI-x update indicator indicating an update state of the dynamic system information.

It will be assumed that scheduling system information, i.e., SI-1, provides scheduling information regarding three pieces of dynamic system information, i.e., SI-p, SI-q, and SI-r. The scheduling system information indicates start times of the three pieces of dynamic system information and update states of the respective pieces of dynamic system information. Table 3 shows an example of the scheduling information regarding the dynamic system information.

TABLE 3

| Dynamic SI | Start time of dynamic SI | SI-x update indicator |
|---|---|---|
| SI-p | Tp | 1 bit |
| SI-q | Tq | 1 bit |
| SI-r | Tr | 1 bit |

The scheduling system information indicates the update state of each piece of dynamic system information together with the start time of each piece of dynamic system information. The SI-x update indicator uses 1 bit to indicate an update state of corresponding dynamic system information. Only for dynamic system information of which update state is indicated by the SI-x update indicator, the UE can receive the dynamic system information from a start time to an end time of the dynamic system information. Since the UE can selectively receive only updated dynamic system information among a plurality of pieces of dynamic system information, the procedure of obtaining system information can be skipped when unnecessary. Thus, battery consumption can be reduced.

For example, when the UE returns to a cell coverage after moving out of the cell coverage, some of the previously obtained plurality of pieces of dynamic system information may be effective information or updated information. Among them, the UE may receive only updated dynamic system information instead of receiving again effective dynamic system information by using the SI-x update indicator.

Figure 14:
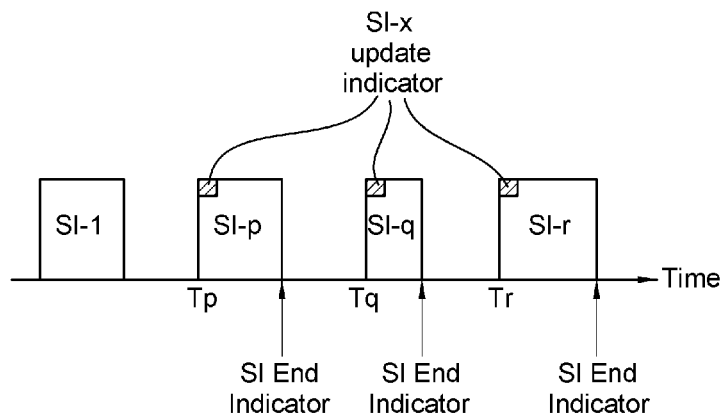
FIG. 14 shows a method for acquiring system information according to another embodiment of the present invention.

FIG. 14 shows a method for acquiring system information according to another embodiment of the present invention.

Referring to FIG. 14, scheduling system information indicates scheduling information regarding a plurality of pieces of dynamic system information by using start times of the respective pieces of dynamic system information. An SI-x update indicator may be included in each piece of dynamic system information to indicate an update state of each piece of dynamic system information.

It will be assumed that scheduling system information, i.e., SI-1, provides scheduling information regarding three pieces of dynamic system information, i.e., SI-p, SI-q, and SI-r. The scheduling system information indicates only start times of the three pieces of dynamic system information as shown in Table 2 above. The SI-x update indicator may be included in corresponding dynamic system information. The SI-x update indicator of each piece of dynamic system information may be located in a front portion of each piece of dynamic system information.

The UE evaluates the SI-x update indicator of each piece of dynamic system information, and, if the dynamic system information is not updated, can use previously obtained effective dynamic system information without decoding the dynamic system information. The UE evaluates the SI-x update indicator, and, if the dynamic system information is updated, receives the dynamic system information from a start time to an end time of the dynamic system information. Since the UE can selectively receive only updated dynamic system information by evaluating the respective SI-x update indicators from a plurality of pieces of dynamic system information, the procedure of obtaining system information can be skipped when unnecessary. Thus, battery consumption can be reduced.

Figure 15:
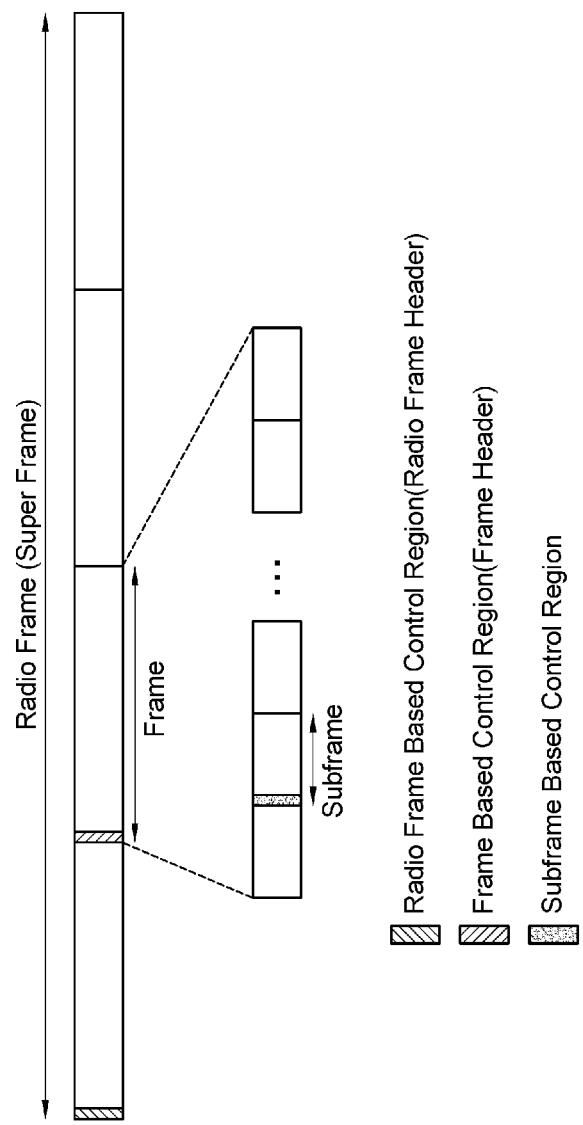
FIG. 15 shows a frame layer structure to explain transmission of system information.

FIG. 15 shows a frame layer structure to explain transmission of system information.

Referring to FIG. 15, a radio frame (or a super frame) includes at least one frame. The frame includes at least one subframe.

At least one radio frame based control region is assigned to the radio frame. The radio frame based control region can be assigned to a first position of the radio frame along a time domain, which can be referred to as a radio frame header. The radio frame header may be assigned to a first frame among a plurality of frames included in the radio frame. The radio frame based control region can be used for a common control channel. The common control channel is used to transmit system information and information on frames included in the radio frame. System information having a fixed periodicity can be transmitted through the common control channel. For example, scheduling system information, i.e., SI-1, may be assigned to the radio frame based control region. If the radio frame has a size of 20 ms, scheduling system information having a period of 80 ms can be transmitted in every four radio frames.

At least one frame based control region is assigned to the frame. The frame based control region can be assigned to a first position of the frame along the time domain, which can be referred to as a frame header. The frame header may be assigned to a first subframe among a plurality of subframes included in the frame. The frame based control region is used to transmit information regarding a plurality of subframes included in the frame. The frame based control region can be optionally used for system information having a fixed periodicity. For example, scheduling system information, i.e., SI-1, may be transmitted through the frame based control region. The frame may have a size of 5 ms. A radio frame having a size of 20 ms can include four frames.

A subframe is a basic unit of constituting a frame and includes a plurality of OFDM symbols. The subframe may include at leas one subframe based control region. The subframe based control region can be assigned to a front portion in each subframe along the time domain. The subframe based control region may be used to indicate radio resource allocation information of the subframe. For example, dynamic system information (i.e., SI-x) of which periodicity is not fixed may be assigned to the subframe, and an SI-x update indicator of each piece of dynamic system information can be transmitted through the subframe based control region.

When the frame layer structure is constructed of a radio frame, a frame, and a subframe, system information can be transmitted in various manners. An example of transmitting the system information will be described.

(1) Scheduling system information may be transmitted through a radio frame header, and dynamic system information may be transmitted through a subframe. Scheduling information regarding the dynamic system information may be indicated by a subframe index. The subframe index corresponds to a start time of the system information.

(2) Scheduling system information may be transmitted through a frame header of a specific frame in a radio frame, and dynamic system information may be transmitted through a subframe. Scheduling information regarding the dynamic system information may be indicated by a subframe index through the frame header.

(3) Scheduling system information may be transmitted through a radio frame header or a specific frame header, and dynamic system information may be transmitted through a subframe based control region. In this case, scheduling information regarding the dynamic system information may be indicated by a subframe index, and the subframe index denotes a corresponding subframe based control region.

(4) Scheduling system information may be transmitted through a radio frame header, and dynamic system information may be transmitted through a frame based control region. Scheduling information regarding the dynamic system information may be indicated by a frame index.

An end time of system information may be implicitly determined to a last portion of a corresponding subframe, may be assigned to a last portion of system information assigned to the subframe, or may be indicated through the subframe based control region. An SI update indicator may be transmitted together with the scheduling system information or may be transmitted by being indicated by each piece of dynamic system information.

An example of transmitting system information in a frame layer structure constructed of a radio frame, a frame, and a subframe has been described above. The frame layer structure is for exemplary purposes only. Thus, the frame layer structure may be constructed of further divided layers, or any one of the layers may be omitted. For example, the subframe may be divided into smaller assignment units so that the dynamic system information is assigned based on the assignment units. Even if the frame layer structure is modified, the scheduling information of the system information may indicate the dynamic system information in the same manner.

Now, change and update of system information will be described.

Figure 16:
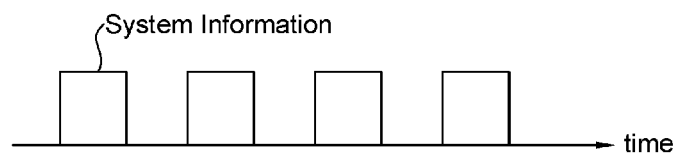
FIG. 16 shows a conventional method for receiving system information.

FIG. 16 shows a conventional method for receiving system information.

Referring to FIG. 16, a BS periodically transmits the system information since the system information has to be known to all UEs within one cell. The UE performs decoding by continuously receiving the periodically transmitted system information. The UE communicates with the BS by using the received system information until the system information is changed.

The system information may be arbitrarily changed/updated periodically or when necessary. However, since the UE cannot know the change of the system information, the UE performs decoding by receiving all pieces of system information periodically received. When the UE is in a discontinuous reception (DRX) mode, the UE is powered on according to a predetermined period in order to reduce battery consumption, and only system information transmitted using a paging message is received. On the other hand, when the UE is in a radio resource control (RRC) connected mode, the UE receives and decodes all pieces of system information periodically transmitted. In a case where previously received system information is known and the system information is not changed, battery consumption of the UE can be reduced in such a manner that the UE communicates with the BS by using the previously received system information without having to periodically receive the system information, and only when the system information is changed, the changed system information is received to be used. Unnecessary battery consumption may occur when the UE in the RRC connected mode periodically receives and decodes all pieces of system information.

Accordingly, there is a need for a method for effectively changing/updating system information.

Figure 17:
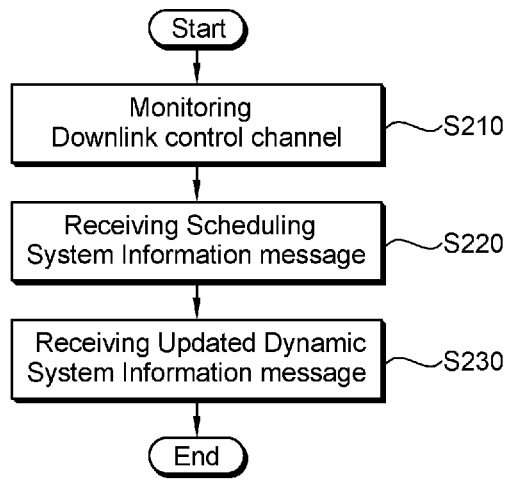
FIG. 17 is a flowchart showing a method for receiving system information by a UE according to an embodiment of the present invention.

FIG. 17 is a flowchart showing a method for receiving system information by a UE according to an embodiment of the present invention.

Referring to FIG. 17, the UE monitors a downlink control channel to detect a system information change notification (step S210). A BS transmits a message for reporting a change of the system information through the downlink control channel. The system information change notification may be an identity for indicating the change of the system information, and may be referred to as a system information change radio network temporary identity (RNTI). The downlink control channel may be a physical downlink control channel (PDCCH). The BS can periodically transmit the identity for indicating the change of the system information in a repetitive manner through the PDCCH.

The UE monitors the downlink control channel at a periodic occasion specifically defined for the system information change notification. When the system information change notification is received while monitoring the downlink control channel, the UE can know that the system information will be changed. The UE monitors the downlink control channel in an RRC connected mode. The downlink control channel can be a PDCCH or a PCCH.

In a case where the UE has previously received system information, the UE regards the previously received system information as effective system information until a system information change notification message is received. If the system information change notification message is not received while monitoring the downlink control channel, the UE does not decode dynamic system information and scheduling system information transmitted through a physical downlink shared channel (PDSCH).

Meanwhile, when the UE operates in an RRC idle mode, the BS can transmit the system information change notification by using a paging message. The paging message can be transmitted through a paging control channel (PCCH) in logical channel or a PDSCH in physical channel. Upon receiving the paging message, the UE in the RRC idle mode can know that the system information will be changed. Upon receiving the paging message, the UE in the RRC connected mode can know that the system information will be changed.

The UE receives a scheduling system information message (step S220). When the system information change notification is not detected from the downlink control channel, the UE receives the scheduling system information message. The UE can obtain scheduling information regarding the scheduling system information message from a broadcast system information message transmitted through a broadcast channel (BCH). The scheduling system information message is transmitted through a DL-SCH/PDSCH. The scheduling system information message can be transmitted with a fixed periodicity. That is, the scheduling system information message can be transmitted through a subframe fixed within a radio frame including a plurality of subframes. For example, the radio frame can have a length of 10 ms, that is, can include 10 subframes each having a length of 1 ms. In this case, scheduling system information can be transmitted using a 5th subframe.

The scheduling system information message includes an update indicator and scheduling information regarding at least one dynamic system information message. The scheduling information regarding the dynamic system information message is scheduling information indicating periodicity of other system information except for the scheduling system information message. For example, the scheduling information regarding the dynamic system information message may indicate a start time of the dynamic system information message. The UE can know a time point at which update system information is transmitted using the scheduling information regarding the dynamic system information. The scheduling system information message is received more frequently than the dynamic system information message. The update indicator indicates whether the dynamic system information changes. By using the update indicator, the UE can confirm that previously obtained system information is valid ever since the UE moves out of the cell coverage until the UE re-enters the cell coverage.

The scheduling system information message may further include one or more public land mobile network (PLMN) identities, each of which is an identity for a cell providing a radio access, a tracking area code which is an identity for a tracking area in which a cell is included, a cell identity which is a unique identity for the cell, SIB mapping information, etc.

The UE receives an updated dynamic system information message (step S230). The UE can receive the updated dynamic system information by using the scheduling information regarding the dynamic system information obtained from the scheduling system information message. The dynamic system information is transmitted through the DL-SCH/PDSCH. The dynamic system information message can be repetitively transmitted during a system information repetition period. The dynamic system information message may have various types. Different types of dynamic system information messages can have the same or different periodicity. That is, the system information repetition period may have various periods according to the type of dynamic system information message.

When the system information is changed, the BS transmits the updated dynamic system information at a next system information repetition period after elapsing a current system information repetition period. The UE receives the updated dynamic system information message after elapsing a system information repetition period at which the update indicator is received.

Figure 18:
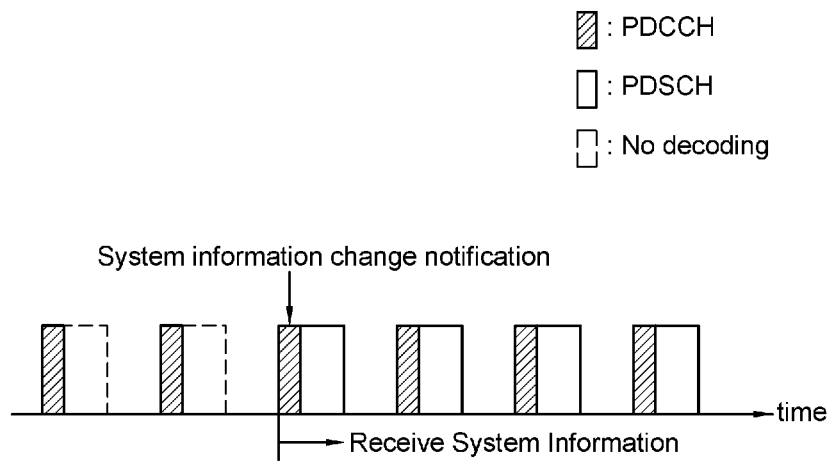
FIG. 18 shows a method for transmitting system information according to an embodiment of the present invention.

FIG. 18 shows a method for transmitting system information according to an embodiment of the present invention.

Referring to FIG. 18, a BS periodically transmits the system information. The BS transmits broadcast system information through a BCH and transmits scheduling system information and dynamic system information through a PDSCH according to corresponding periods. The broadcast system information includes scheduling information regarding the scheduling system information. The scheduling system information includes an update indicator indicating an update of scheduling information regarding the dynamic system information or an update of the dynamic system information.

When a UE has previously received system information, the UE does not decode the scheduling system information and dynamic system information transmitted through the PDSCH. Instead, the UE monitors only a PDCCH.

In a case where a network determines to change the system information, the BS transmits to the UE a system information change notification through the PDCCH in order to report a change of the system information. The BS instructs the update of the dynamic system information by using the update indicator included in the scheduling system information. When the system information change notification is received while monitoring the PDCCH, the UE receives the scheduling system information transmitted through the PDSCH. The UE can confirm the update of the dynamic system information by using the update indicator included in the scheduling system information, and also can know a time point for transmitting the dynamic system information updated by using the scheduling information regarding the dynamic system information.

The BS transmits the updated dynamic system information through the PDSCH when a next system information repetition period starts after elapsing a current system information repetition period for the dynamic system information. The UE receives the updated dynamic system information according to the scheduling information regarding the dynamic system information.

Figure 19:
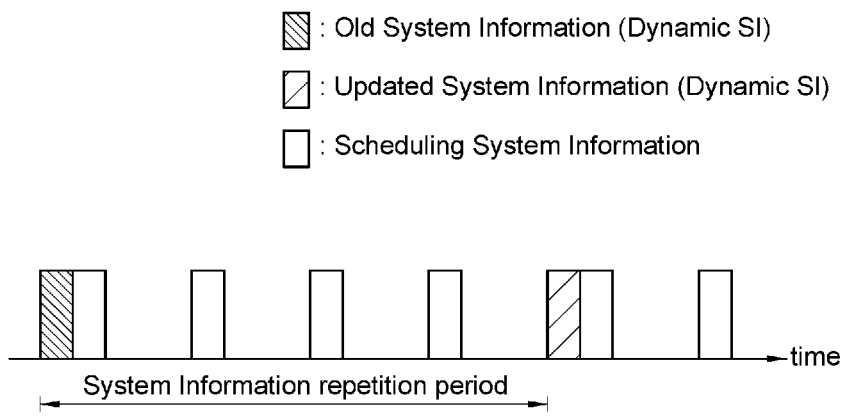
FIG. 19 shows a method for updating system information according to an embodiment of the present invention.

FIG. 19 shows a method for updating system information according to an embodiment of the present invention.

Referring to FIG. 19, a BS transmits scheduling system information and dynamic system information through a PDSCH. The scheduling system information is most frequently transmitted in a repetitive manner among a plurality of pieces of system information. That is, the scheduling system information is more frequently transmitted than the dynamic system information. One or more pieces of dynamic system information can be transmitted within a system information repetition period. Within the same system information repetition period, dynamic system information including the same system information parameter is transmitted. An update indicator indicating an update of system information at a current system information repetition period can be transmitted using the scheduling system information. Old system information, that is dynamic system information before update, is transmitted in a system information repetition period in which the update indicator is transmitted. Updated system information, that is dynamic system information after update, is transmitted in a next system information repetition period.

A UE can update the system information by receiving the updated system information after elapsing the system repetition period in which the update indicator is received.

Every function as described above can be performed by a processor such as a microprocessor based on software coded to perform such function, a program code, etc., a controller, a micro-controller, an Application Specific Integrated Circuit (ASIC), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of updating, by a user equipment (UE), a system information in a wireless communication system, the method comprising:
    monitoring, by the UE, a physical downlink control channel (PDCCH);
    receiving, by the UE from a base station (BS), a System Information Radio Network Temporary Identifier (SI-RNTI) via the PDCCH;
    receiving, by the UE from the BS, first system information on a downlink shared channel (DL-SCH) in accordance with the SI-RNTI;
    applying, by the UE, the first system information only until a second system information is received;
    receiving, by the UE from the BS,
        a paging message that includes a system information change notification indicating that the BS will change system information, and
        a scheduling system information message that includes a value tag indicating that the BS has changed the system information,
        wherein the paging message is received from the BS via a paging control channel (PCCH), and
        wherein the scheduling system information message is received from the BS via the DL-SCH;
    based on the system information change notification and the value tag, receiving, by the UE from the BS, the second system information on the DL-SCH in accordance with the SI-RNTI; and
    applying the second system information by the UE.

2. The method of claim 1, further comprising:
    receiving a master system information comprising scheduling information for the scheduling system information.

3. The method of claim 2, wherein the master system information is received via a broadcast control channel (BCCH) in a logical channel.

4. The method of claim 1, wherein the second system information is received immediately following a start of a subsequent system information repetition period.

5. The method of claim 1, wherein the user equipment is either in a radio resource control (RRC) idle mode or an RRC connected mode.

6. The method of claim 1, further comprising:
decoding the SI-RNTI to obtain a system information window length and a system information transmission period.

7. The method of claim 1, wherein the paging message is received when the UE is in one of a RRC idle mode or a RRC connected mode.

8. The method of claim 1, wherein the step of receiving at least one of the paging message and the value tag comprises:
receiving the scheduling system information message after receiving the paging message.

9. The method of claim 1, wherein the step of receiving at least one of the paging message and the value tag comprises:
receiving only one of the paging message and the scheduling system information message.

10. The method of claim 1, wherein the scheduling system information message is received via the DL-SCH in accordance with the SI-RNTI.

11. A user equipment in a wireless communication system, the user equipment comprising:
a radio frequency (RF) unit; and
a processor operatively coupled to the RF unit, and configured to:
monitor a physical downlink control channel (PDCCH);
receive, from a base station (BS), a System Information Radio Network Temporary Identifier (SI-RNTI) via the PDCCH;
receive, from the BS, first system information on a downlink shared channel (DL-SCH) in accordance with the SI-RNTI;
apply the first system information only until a second system information is received;
receive, from the BS,
a paging message that includes a system information change notification indicating that the BS will change system information, and
a scheduling system information message that includes a value tag indicating that the BS has changed the system information,
wherein the paging message is received from the BS via a paging control channel (PCCH), and
wherein the scheduling system information message is received from the BS via the DL-SCH;
based on the system information change notification and the value tag, receive, from the BS, the second system information on the DL-SCH in accordance with the SI-RNTI; and
apply the second system information by the UE.

12. The user equipment of claim 11, wherein the processor is further configured to:
receive a master system information comprising scheduling information for the scheduling system information.

13. The user equipment of claim 12, wherein the master system information is received via a broadcast control channel (BCCH) in a logical channel.

14. The user equipment of claim 11, wherein the second system information is received immediately following a start of a subsequent system information repetition period.

15. The user equipment of claim 11, wherein the user equipment is either in a radio resource control (RRC) idle mode or a RRC connected mode.

16. The user equipment of claim 11, wherein the processor is further configured to decode the SI-RNTI to obtain a system information window length and a system information transmission period.

17. The user equipment of claim 11, wherein the paging message is received when the UE is in one of a RRC idle mode or a RRC connected mode.

18. The user equipment of claim 11, wherein the processor receives the scheduling system information message after receiving the paging message.

19. The user equipment of claim 11, wherein the processor receives only one of the paging message and the scheduling system information message.

20. The user equipment of claim 11, wherein the scheduling system information message is received via the DL-SCH in accordance with the SI-RNTI.

* * * * *